United States Patent [19]
Okamoto

[11] Patent Number: 6,094,272
[45] Date of Patent: Jul. 25, 2000

[54] COLOR DISCRIMINATION SYSTEM

[75] Inventor: Yasuhiro Okamoto, Osaka, Japan

[73] Assignee: Keyence Corporation, Osaka, Japan

[21] Appl. No.: 09/343,214

[22] Filed: Jun. 30, 1999

[51] Int. Cl.[7] ..................................... G01J 3/50
[52] U.S. Cl. ................ 356/402; 356/406; 356/425; 250/226
[58] Field of Search .................. 356/402, 405, 356/406, 407, 425; 250/226

[56] References Cited

U.S. PATENT DOCUMENTS 4,834,541  5/1989  Yamabe ................................ 356/425

*Primary Examiner*—F. L. Evans
*Attorney, Agent, or Firm*—Morgan, Lewis & Bockius LLP

[57] ABSTRACT

A color discrimination system resistant to distance variation for displaying a color match degree using a digital display, such as a bar graph. In the color discrimination system, light reflected or transmitted from a measurement object is received, wherein the light includes at least two of R (red), G (green), and B (blue) colors. A sum total of measured light reception quantities of the colors and ratios of the respective measured light reception quantities of the colors to the sum total of measured light reception is then calculated. A comparison of the calculated values of the sum total and/or the ratios of the measured light reception quantities of the colors to the sum total with reference values of the sum total of light reception quantities and/or the ratios of the light reception quantities of the colors to the reference value of sum total for a reference object is performed, thereby discriminating between color of the measurement object and color of the reference object. The color difference indicates a match degree, and the match degree is displayed digitally in the format fitted to the sense of a human being.

16 Claims, 6 Drawing Sheets

COLOR DISCRIMINATION SYSTEM

BACKGROUND OF THE INVENTION

1. Field of the Invention

This invention relates to a color discrimination system used for detecting an object according to color.

2. Description of Related Art

Color discrimination systems may be placed on an automatic transport line of a factory in order to detect the presence or absence of an object moving on the line. These systems may also detect a specific object by collating the color of the object (i.e., measurement object) moving on the line, with the color provided to a detection object.

A known color discrimination system is made up of a light transmission section for transmitting light and a light reception section for receiving light reflected from an object or light penetrating an object. This color discrimination system emits light, and then receives the light after it is reflected by a measurement object for each of different light wavelengths of, for example, R, G, and B.

The system then finds the sum total of the R, G, and B light reception quantities and the ratio of each of the R, G, and B light reception quantities to the sum total. Each of these ratios is compared with a ratio of the light reception quantity for each wavelength preset for a detection object, and then a color match or mismatch between the measurement object and the detection object is displayed.

This color discrimination system suffers from a drawback in that it can only detect color match or mismatch between the measurement object and the detection object. A relative color match degree cannot be determined.

BRIEF SUMMARY OF THE INVENTION

It is an object of the present invention to overcome the drawback of the color discrimination system described above.

According to a first aspect of the invention, there is provided a color discrimination system comprising: means for receiving light reflected or transmitted from a measurement object, wherein the light includes at least two of R (red), G (green), and B (blue) colors; means for calculating a sum total of measured light reception quantities of the colors and ratios of the respective measured light reception quantities of the colors to the sum total of measured light reception; and means for comparing the calculated values of the sum total and/or the ratios of the measured light reception quantities of the colors to the sum total,with reference values of the sum total of light reception quantities and/or the ratios of the light reception quantities of the colors to the reference value of sum total for a reference object, thereby discriminating between color of the measurement object and color of the reference object, wherein the comparison result is displayed in numerical form.

According to a second aspect of the invention, there is provided a color discrimination system comprising: means for receiving light reflected or transmitted from a measurement object, wherein the light includes at least two of R (red), G (green), and B (blue) colors; means for calculating a sum total of measured light reception quantities of the colors and ratios of the respective measured light reception quantities of the colors to the sum total of measured light reception; and means for comparing the calculated values of the sum total and/or the ratios of the measured light reception quantities of the colors to the sum total with reference values of the sum total of light reception quantities and/or the ratios of the light reception quantities of the colors to the reference value of sum total for a reference object, thereby discriminating between color of the measurement object and color of the reference object, wherein a sum total of differences between the values of the ratios of the light reception quantities of the colors to the reference value of the sum total for the reference object and the calculated values of the ratios of the respective measured light reception quantities of the colors to the sum total for the measurement object is calculated, the sum total of differences being assumed to be a color difference, and wherein an addition result of the color difference and the ratio of the difference between the sum total of measured light reception quantities from the measurement object and the reference value of sum total of light reception quantities from the reference object to the reference value of sum total of light reception quantities from the reference object is displayed in numerical form.

According to a third aspect of the invention, there is provided a color discrimination system comprising: light transmission means for transmitting light having at least two different colors of R (red), G (green), and B (blue) to a measurement object; drive means for turning on the light transmission means in a time division manner; light reception means for receiving light reflected or transmitted from the measurement object for each of the different light colors; operation means for calculating a detected sum total of light reception quantities of colors based on a light reception signal of light received by the light reception means and ratios of the respective light reception quantities of the colors to the detected sum total and comparing the calculated values of the detected sum total of light reception quantities and/or the ratios of the respective light reception quantities of the colors to the detected sum to a reference sum total of reference values of light reception quantities and/or reference ratios of reference light reception quantities of the colors to the reference sum total for a reference object, thereby discriminating between color of the measurement object and color of the reference object; and display means for displaying the comparison result in numerical form.

DETAILED DESCRIPTION OF THE INVENTION

Figure 1:
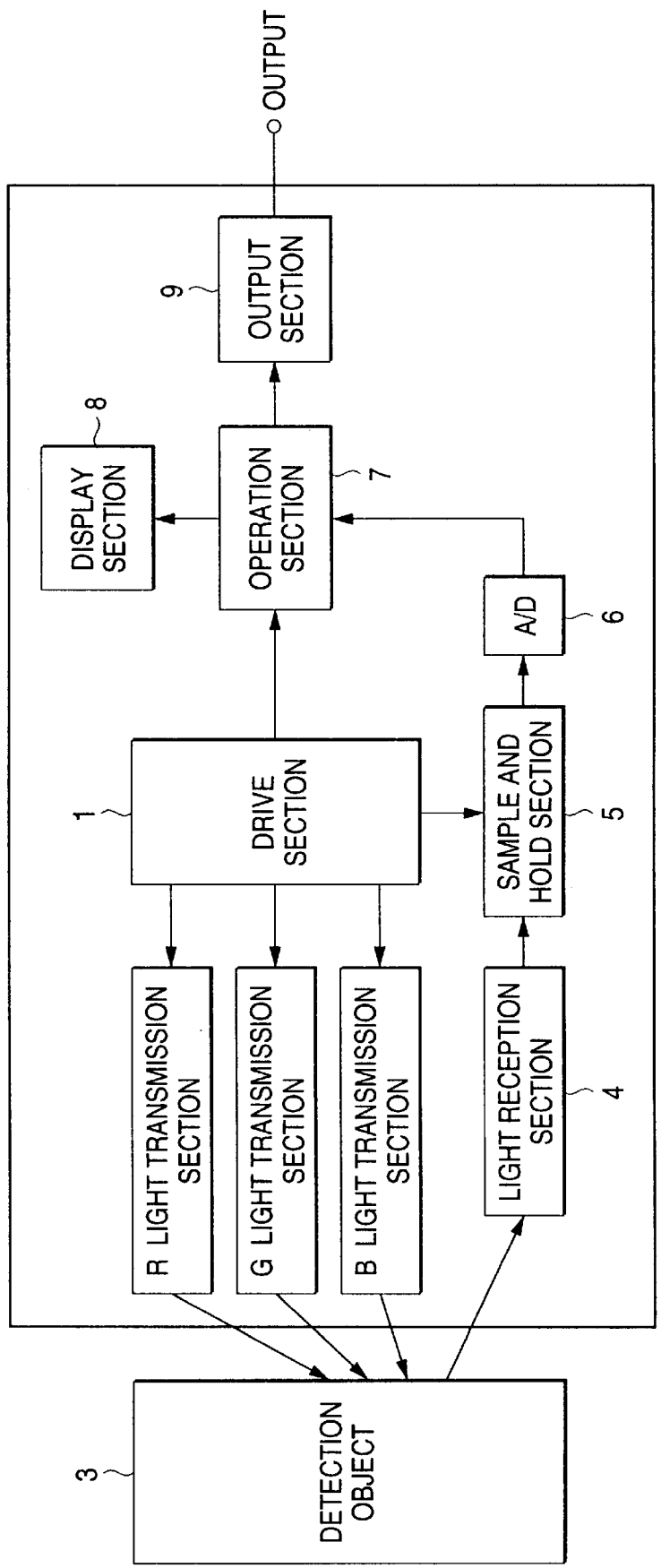
FIG. 1 is a block diagram of a color discrimination system according to a first embodiment of the invention.
Figure 8:
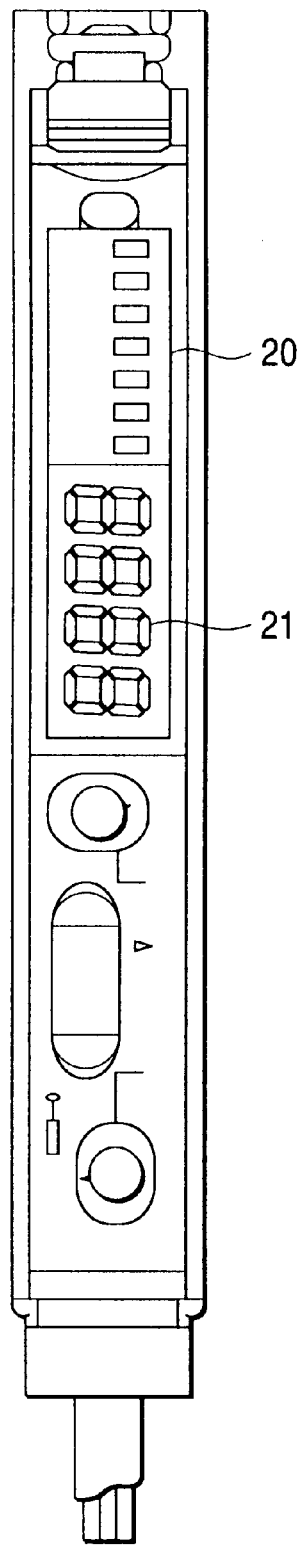
FIG. 8 is a diagram of an example of a color discrimination sensor of the color discrimination system shown in FIG. 1.

FIG. 1 is a block diagram of a color discrimination system according to a first embodiment of the invention. In the figure, reference numeral 1 denotes a drive section of LEDs (light emitting diodes) for driving and turning on three LEDs of R (red), G (green), and B (blue) in a time division manner. Reference numeral 2 denotes a light transmission section for causing the elements (i.e., three LEDs of R, G, and B) driven by a signal from the drive section 1 to emit light toward a detection object 3. Reference numeral 4 denotes a light reception section of a photodiode, for receiving reflected light from the detection object 3. Reference numeral 5 denotes a sample and hold section for holding a light reception signal at the light transmission timing of each LED. Reference numeral 6 denotes an A/D conversion section for converting the sampled and held light reception signal from analog form into digital form. Reference numeral 7 denotes an operation section comprising a CPU (central processing unit), memory, comparator, etc., for receiving the A/D values of the light reception signals and performing color discrimination operations. Reference numeral 8 denotes a display section for displaying the light reception quantity, light reception ratio of operation result, color difference, etc., in various forms such as digital, graphical (e.g., bar graphs), etc. Reference numeral 9 denotes an output section for outputting an on/off state signal to an external PCL, based on the operational result of the operation section 7. FIG. 8 shows an example of a simple color discrimination sensor, to illustrate how a bar graph display and a numeric display of the invention are produced by the actual system. In the figure, a bar graph LED monitor 20 produces a bar graph display and a digital LED monitor 21 produces a numeric display.

Figure 2:
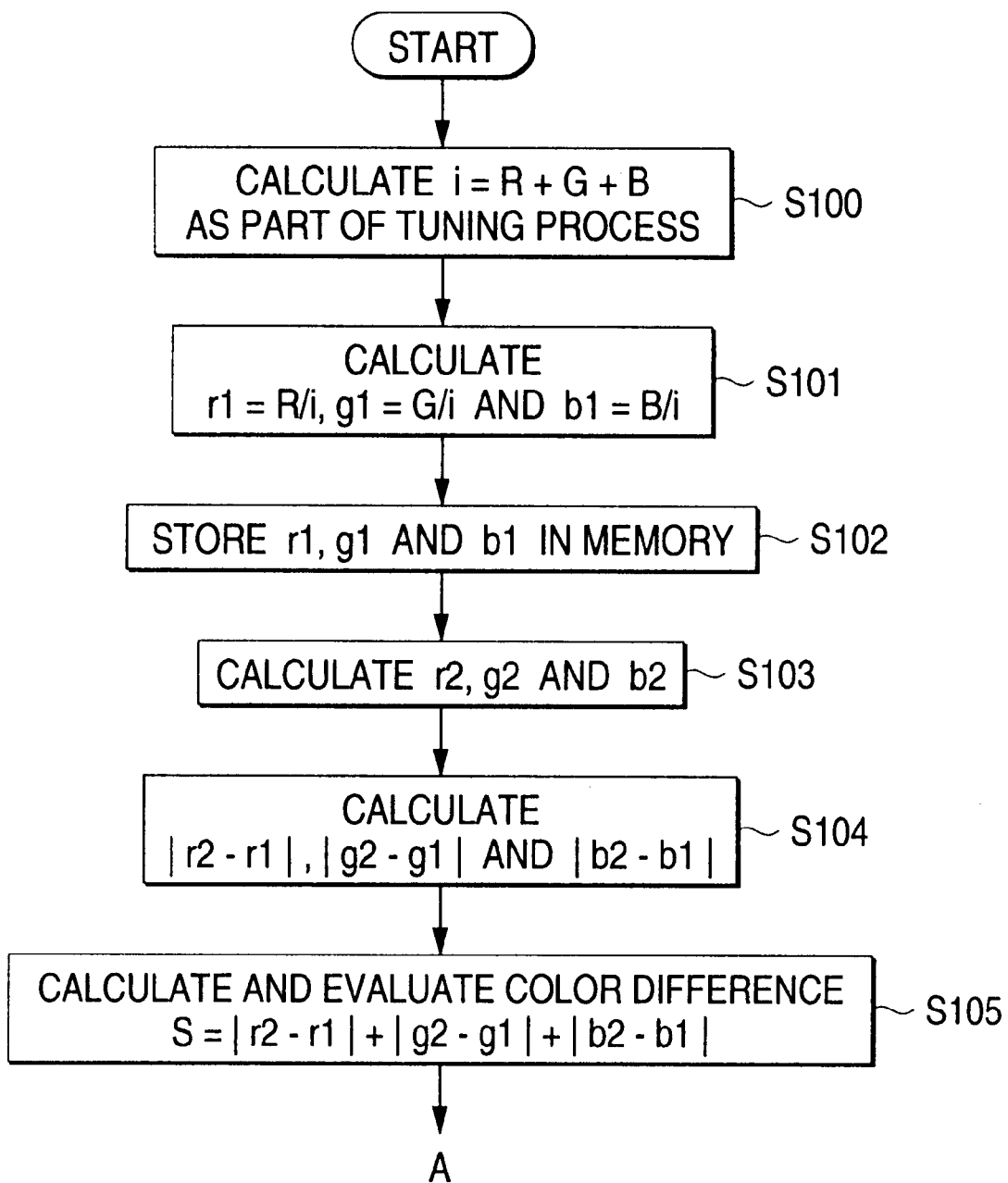
FIG. 2 is a process flowchart of the color discrimination system according to the first embodiment of the invention.

FIG. 2 is a process flowchart of the color discrimination system according to the first embodiment of the invention. As shown in the figure, first, a reference total light reception signal of R, G, and B, i=R+G+B, is calculated as part of a tuning (setting) process at step S100.

Next, at step S101, ratios of reference R, G, and B signals to the reference total light reception signal i, r1, g1, and b1, respectively, are calculated using the following equations:

$$r1 = R/i;$$

$$g1 = G/i; \text{ and}$$

$$b1 = B/i.$$

The ratios of reference color signals, r1, g1, and b1 are stored in memory at step S102.

Next, to execute actual color measurement upon completion of the tuning process, ratios (r2, g2 and b2) of R, G, and B to the total light reception signal of the measured color, are calculated at step S103 according to a similar procedure as described above. Differences between the ratios r2, g2, and b2 based on actual measurements and the ratios r1, g1, and b1 of the reference colors, which are stored in memory, are calculated at step S104.

The sum total of the calculated differences $|r2-r1|$, $|g2-g1|$, and $|b2-b1|$ is calculated as the color difference in accordance with the following equation:

$$\text{Color Difference } S = |r2-r1| + |g2-g1| + |b2-b1|.$$

Based on the calculated color difference S, the difference between the measured color and the reference color is evaluated for a degree of matching at step S105.

In the detection process of the invention, the ratios r, g, and b of each light reception signal eliminate change in the light reception signal caused by distance variation between the color discrimination sensor to the detection object. For example, assume that the light reception quantities are R=100, G=200, and B=300, respectively. When the distance between the color discrimination sensor and the detection object becomes long, the light reception signals are reduced in half to R=50, G=100, and B=150, respectively. On the other hand, the ratios do not change. That is, accurate color components may be calculated by using ratios.

The match degree is displayed in the following manner.

Figure 3:
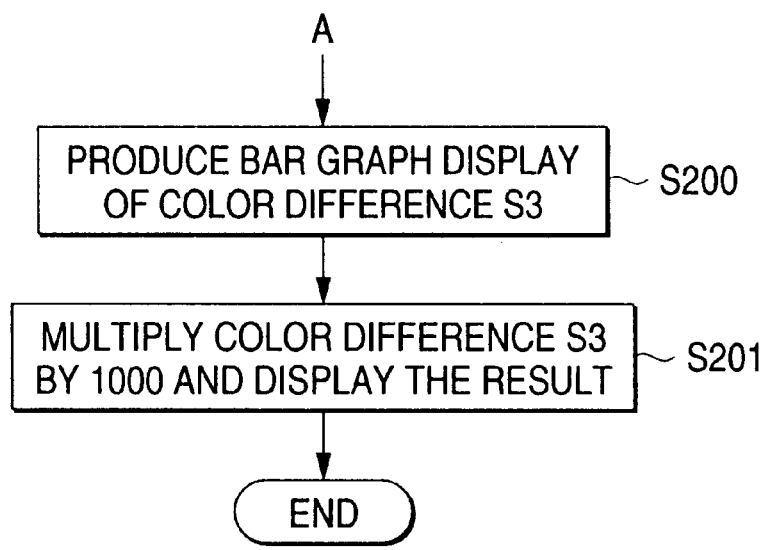
FIG. 3 is a process flowchart of bar graph display processing of the color discrimination system according to the first embodiment of the invention.
Figure 4:
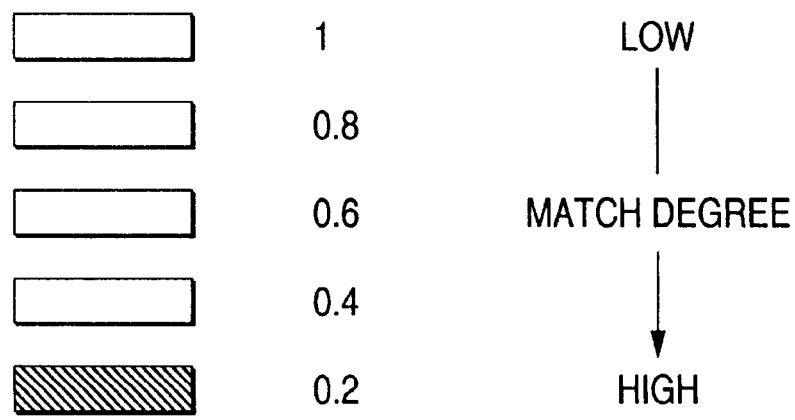
FIG. 4 is a diagram showing a bar graph display example of a display section shown in FIG. 1.

If the color difference S is 0.218 at steps S200 and S201 in FIG. 3, a bar graph display is produced by a digital bar graph formed of LEDs on the display section 8 in FIG. 1, as shown in FIG. 4 at step S200. The bar graph in FIG. 4 displays the match degree using five bars at 0.2 increments from 0.2 to 1.0. The bottom bar 0.2 indicates the smallest color difference S, namely, the highest match degree; the top bar 1.0 indicates the largest color difference S, namely, the lowest match degree. In this example, color difference S=0.218 falls within the area of the bottom bar 0.2, and thus the LED of the 0.2 bar is turned on.

Next, a second embodiment of the invention will be described with reference to FIGS. 3 and 5.

Figure 5:
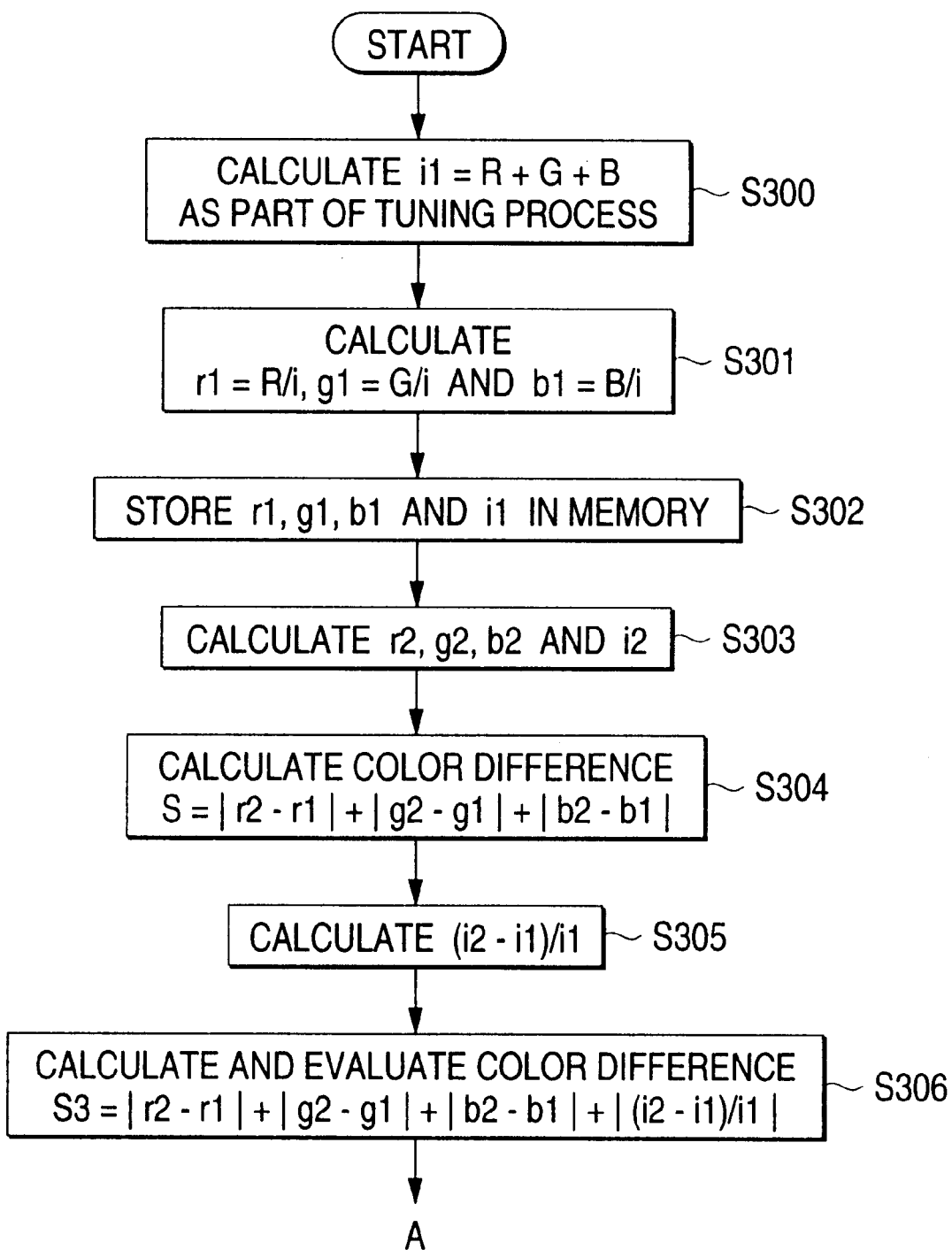
FIG. 5 is a flowchart of processing of a color discrimination system according to a second embodiment of the invention.

FIG. 5 is a process flowchart of a color discrimination system according to a second embodiment of the invention.

First, a reference total light reception signal of R, G, and B, i1=R+G+B, is calculated as part of a tuning (setting) process at step S300. Next, reference ratios of R, G, and B signals to the reference total light reception signals i1, r1, g1, and b1, respectively, are calculated at step S301 according to the following equations:

$$r1 = R/i;$$

$$g1 = G/i; \text{ and}$$

$$b1 = B/i.$$

The reference ratio values r1, g1, and b1 and light and shade data of the reference total light reception signal i1 are stored in memory at step S302.

Next, when the color of a detection object is measured, r2, g2, and b2 of the measured color and total light reception signal i2 are calculated at step S303. Next, the sum total of $|r2-r1|$, $|g2-g1|$, and $|b2-b1|$ is calculated at step S304.

Subsequently, a change rate of the total light reception signal, (i2−i1)/i1, is found at step S305 and is added to the sum total found by the preceding calculation in step S304 to calculate a color difference S3 according to the following equation:

$$\text{Color Difference } S3 = |r2-r1| + |g2-g1| + |b2-b1| + |(i2-i1)/i1|.$$

Finally, at step S306, the difference between the measured color and the reference color is evaluated according to the 15 calculated color difference S3.

Here, (i2−i1)/i1 is calculated and added to calculate the change rate of the total light reception signal and matching dimensions, whereby evaluation for every color change is enabled.

In the second embodiment, the ratios of R, G, and B as light sources to the total light reception signals, r, g, and b, respectively, are used. However, for example, the ratio of B (blue), b, is b=1−r−g. If r and g are known, then b can be determined. Thus, color discrimination can also be executed by evaluation of only r and g. Therefore, if the ratios r1 and g1 during the tuning process are calculated, the ratios r2 and g2 during the measurement process are calculated, and then the color difference $S1 = |r2-r1| + |g2-g2| + |b2-b1|$ is calculated, color discrimination is enabled.

Likewise, r and b or g and b may be combined.

Subsequently, as shown in FIG. 3, bar graph display of the color difference S3 is produced at step S200 and the numeric value of the color difference S3 is multiplied by 1000 and the result is displayed in digits at step S201.

Thus, evaluation for color change caused by factors other than variation in distance is also enabled. The color discrimination process becomes a little vulnerable to variation in distance as compared with the process based only on the ratios because of the addition of correction based on the change rate. However, the follow-up capability is enhanced with respect to color and light and shade and the detection accuracy is improved. If the technique of the related art based only on the ratios and the technique of the invention based on the change rate as well as the ratios are changed whenever necessary, the detection accuracy can be furthermore improved.

Figure 6:
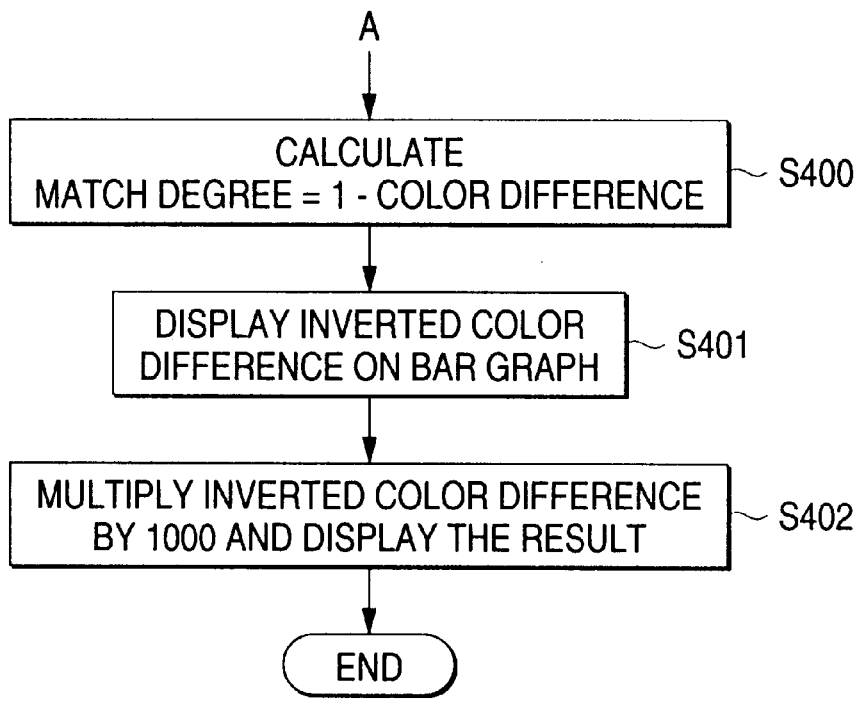
FIG. 6 is a flowchart of bar graph display processing of a display section of a color discrimination system according to a third embodiment of the invention.
Figure 7:
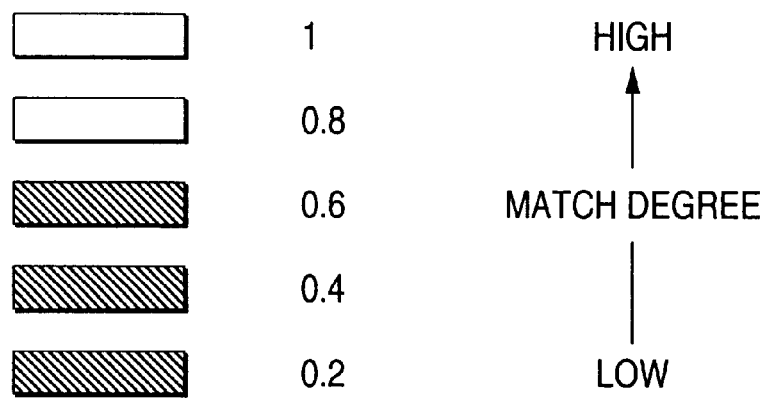
FIG. 7 is a diagram showing a bar graph display example of the display section of the color discrimination system according to the third embodiment of the invention.

Next, a third embodiment of the invention will be described with reference to FIGS. 5 and 6 in combination. That is, as shown in FIG. 5, color discrimination is executed by a change rate addition technique of adding change rate (i2−i1)/i1 to the color difference that can also cope with special color change. The calculated value of color difference S1 is inverted as "match degree=1-color difference", at step S400, and a bar graph display as shown in FIG. 7 is produced at step 401. Further, the match degree may be multiplied by 1000 to display the match degree in a three-digit number at step S402.

For example, if the calculated color difference S is 0.218, the match degree is calculated as 1−0.218=0.782, thereby executing inversion conversion at step S400. The inverted color difference S2=0.782 is displayed on a bar graph so as to turn on the lower three bars, as shown in FIG. 7, at step S401. At the same time, the color difference S2=0.782 is multiplied by 1000 to display digits 782 at step S402. In this case, the bar graph becomes opposite to that in the example in FIG. 4, namely, the higher bar indicates the higher match degree.

This displaying technique produces easy-to-see match degree display indicating natural magnitude relation and the recognition time is shortened, thereby reducing the work processing time. The bar graph form of the invention is not limited to the bars shown in FIG. 4, 7, or 8. Moreover, the number of bars, display color, bar form, and the like are not limited.

While only certain embodiments of the invention have been specifically described herein, it will be apparent that numerous modifications may be made thereto without departing from the spirit and scope of the invention.

What is claimed is:

1. A color discrimination system comprising:
   light reception means for receiving light reflected or transmitted from a measurement object, the light having at least two of R (red), G (green), and B (blue) colors;
   calculation means for calculating a sum total of light reception quantities of the colors that are measured by said light reception means, and ratios of the respective measured light reception quantities of the colors to said sum total of light reception quantities of the colors;
   comparison means for comparing values of the sum total and/or the ratios of the measured light reception quantities of the colors to the sum total with reference values of the sum total and/or the ratios of the measured light reception quantities of the colors to the sum total for a reference object; and
   display means for displaying the comparison result of said comparison means in numerical form.

2. The color discrimination system of claim 1, wherein a sum total of differences between values of the ratios of the light reception quantities of the colors to the sum total for the reference object and calculated values of the ratios of the respective measured light reception quantities of the colors to said sum total of the light reception quantities of the colors is calculated, and wherein the sum total of differences is assumed to be a color difference and the comparison result is the color difference or a value provided by performing an operation on the color difference.

3. The color discrimination system of claim 2, wherein the operation is "1-color difference".

4. The color discrimination system of claim 2, wherein the colors are R (red), G (green), and B (blue), and wherein the color difference is calculated according to the following equation:

$$\text{color difference} = |r2-r1|+|g2-g1|+|b2-b1|,$$

wherein r1, g1, and b1 are the reference values and r2, g2, and b2 are the calculated values.

5. The color discrimination system of claim 1, wherein the display means includes a bar graph display.

6. The color discrimination system of claim 5, wherein the bar graph display comprises light emitting diodes.

7. A color discrimination system comprising:
   means for receiving light reflected or transmitted from a measurement object, wherein the light includes at least two of R (red), G (green), and B (blue) colors;
   means for calculating a sum total of measured light reception quantities of the colors and ratios of the respective measured light reception quantities of the colors to the sum total of measured light reception; and
   means for comparing the calculated values of the sum total and/or the ratios of the measured light reception quantities of the colors to the sum total with reference values of the sum total of light reception quantities and/or the ratios of the light reception quantities of the colors to the reference value of sum total for a reference object, thereby discriminating between color of the measurement object and color of the reference object, wherein a sum total of differences between the values of the ratios of the light reception quantities of the colors to the reference value of the sum total for the reference object and the calculated values of the ratios of the respective measured light reception quantities of the colors to the sum total for the measurement object is calculated, the sum total of differences being assumed to be a color difference, and wherein an addition result of the color difference and the ratio of the difference between the sum total of measured light reception quantities from the measurement object and the reference value of sum total of light reception quantities from the reference object to the reference value of sum total of light reception quantities from the reference object is displayed in numerical form.

8. The color discrimination system of claim 7, wherein the operation is "1-color difference".

9. The color discrimination system of claim 7, wherein the colors are R (red), G (green), and B (blue) and wherein the color difference is calculated according to the following equation:

$$\text{color difference} = |r2-r1+|g2-g1|+|b2-b1|+|(i2-i1)/i1|,$$

wherein r1, g1, and b1 are the reference values, i1 is the reference value of sum total of light reception quantities, r2, g2, and b2 are the calculation values, and i2 is the sum total of measured light reception quantities.

10. A color discrimination system comprising:

light transmission means for transmitting light having at least two different colors of R (red), G (green), and B (blue) to a measurement object;

drive means for turning on said light transmission means in a time division manner;

light reception means for receiving light reflected or transmitted from the measurement object for each of the different light colors;

operation means for calculating a detected sum total of light reception quantities of colors based on a light reception signal of light received by said light reception means and ratios of the respective light reception quantities of the colors to the detected sum total and comparing the calculated values of the detected sum total of light reception quantities and/or the ratios of the respective light reception quantities of the colors to the detected sum to a reference sum total of reference values of light reception quantities and/or reference ratios of reference light reception quantities of the colors to the reference sum total for a reference object, thereby discriminating between color of the measurement object and color of the reference object; and display means for displaying the comparison result in numerical form.

11. A color discrimination system comprising:

light reception means for receiving light reflected or transmitted from a measurement object, the light having at least two of R (red), G (green), and B (blue) colors;

calculation means for calculating a sum total of light reception quantities of the colors that are measured by said light reception means, and ratios of the respective measured light reception quantities of the colors to said sum total of light reception quantities of the colors;

comparison means for comparing values of the sum total and/or the ratios of the measured light reception quantities of the colors to the sum total with reference values of the sum total and/or the ratios of the measured light reception quantities of the colors to the sum total for a reference object; and display means for displaying the comparison result of said comparison means in a bar graph display.

12. The color discrimination system of claim 11, wherein the bar graph display comprises light emitting diodes.

13. A color discrimination system comprising:

a photodiode for receiving light reflected or transmitted from a measurement object, the light having at least two of R (red), G (green), and B (blue) colors;

a calculator for calculating a sum total of light reception quantities of the colors that are measured by said photodiode, and ratios of the respective measured light reception quantities of the colors to said sum total of light reception quantities of the colors;

a comparator for comparing values of the sum total and/or the ratios of the measured light reception quantities of the colors to the sum total with reference values of the sum total and/or the ratios of the measured light reception quantities of the colors to the sum total for a reference object; and a display for displaying the comparison result of said comparator in numerical form.

14. The color discrimination system of claim 13, wherein a sum total of differences between values of the ratios of the light reception quantities of the colors to the sum total for the reference object and calculated values of the ratios of the respective measured light reception quantities of the colors to said sum total of the light reception quantities of the colors is calculated, and wherein the sum total of differences is assumed to be a color difference and the comparison result is the color difference or a value provided by performing an operation on the color difference.

15. The color discrimination system of claim 14, wherein the operation is "1-color difference".

16. The color discrimination system of claim 14, wherein the colors are R (red), G (green), and B (blue), and wherein the color difference is calculated according to the following equation:

$$\text{color difference} = |r2-r1| + |g2-g1| + |b2-b1|,$$

wherein r1, g1, and b1 are the reference values and r2, g2, and b2 are the calculated values.

* * * * *